United States Patent [19]

Cornell et al.

[11] Patent Number: 4,479,694
[45] Date of Patent: Oct. 30, 1984

[54] CABLE CLAMPING DEVICE

[75] Inventors: Paul V. Cornell, London, England; Paul A. Cornell, Knockanore, Ireland

[73] Assignee: Pan Electric Corporation, Beverly Hills, Calif.

[21] Appl. No.: 350,328

[22] Filed: Feb. 19, 1982

Related U.S. Application Data

[63] Continuation of Ser. No. 136,413, Apr. 2, 1980, Pat. No. 4,357,068.

[51] Int. Cl.³ .............................................. H01R 9/10
[52] U.S. Cl. .............................................. 339/266 R
[58] Field of Search ........................................ 339/266

[56] References Cited

U.S. PATENT DOCUMENTS

| | | | |
|---|---|---|---|
| 2,700,807 | 2/1955 | Petersen . | |
| 3,169,818 | 2/1965 | Tracy . | |
| 3,801,952 | 4/1974 | Lawlor . | |
| 3,831,134 | 8/1974 | Cornell et al. . | |
| 3,861,771 | 1/1975 | Cornell | 339/266 R |
| 3,879,104 | 4/1975 | Shugerman et al. . | |
| 3,883,211 | 5/1975 | Shugarman et al. . | |
| 3,973,821 | 8/1976 | Scott et al. | 339/266 R |
| 3,980,381 | 9/1976 | Cornell | 339/266 R |
| 4,001,921 | 1/1977 | Lawlor et al. . | |
| 4,014,078 | 3/1977 | Cornell et al. . | |
| 4,126,918 | 11/1978 | Cornell . | |
| 4,128,294 | 12/1978 | McCord . | |

Primary Examiner—Joseph H. McGlynn
Attorney, Agent, or Firm—Willian, Brinks, Olds, Hofer, Gilson & Lione Ltd.

[57] ABSTRACT

A cable clamping device of the rotary jaw type, including a hook-shaped female member adapted to be mounted on a support, and a male member of symmetrical cross-section with a cylindrical head adapted for rotation within the female hook. Cable-receiving bores in the male and female members and a separate clamping surface on the female shank cooperate to clamp the cable. Size or force adjustability is provided by making the axis of the male bore non-coincident with the axis of symmetry of the male member, and rotating the latter about its axis of symmetry. Cam-locking means are provided to create a resilient clamping pressure on the cable prior to closure, and to ensure positive locking of the device upon complete closure.

9 Claims, 11 Drawing Figures

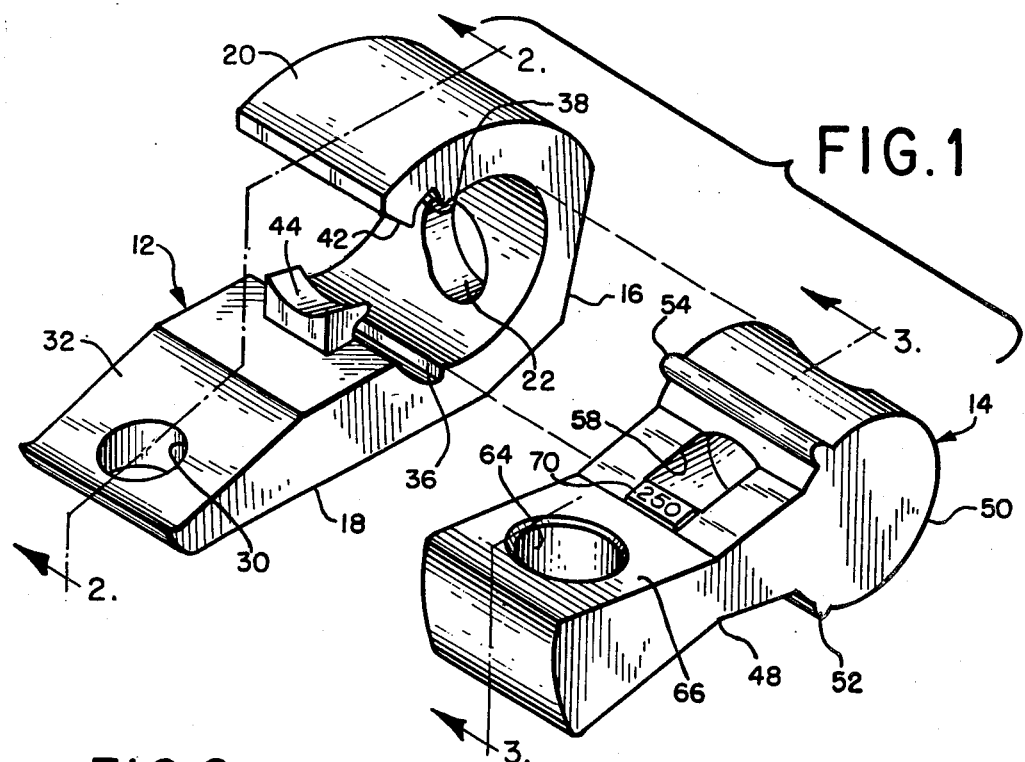

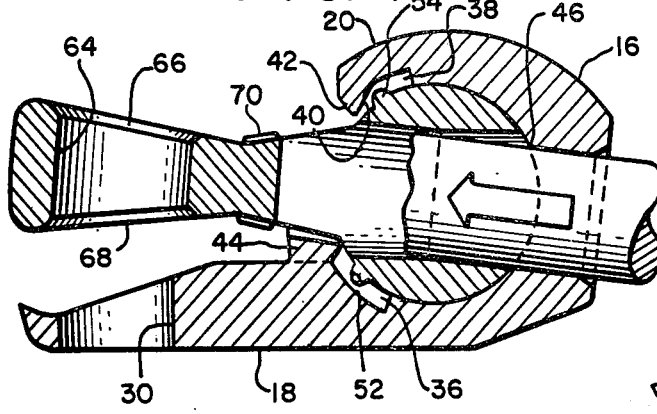
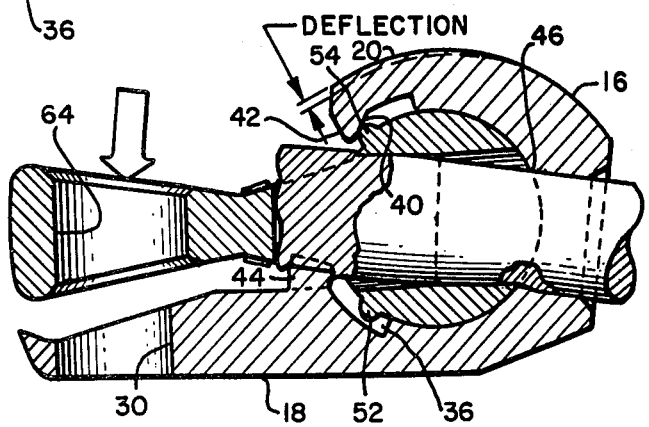
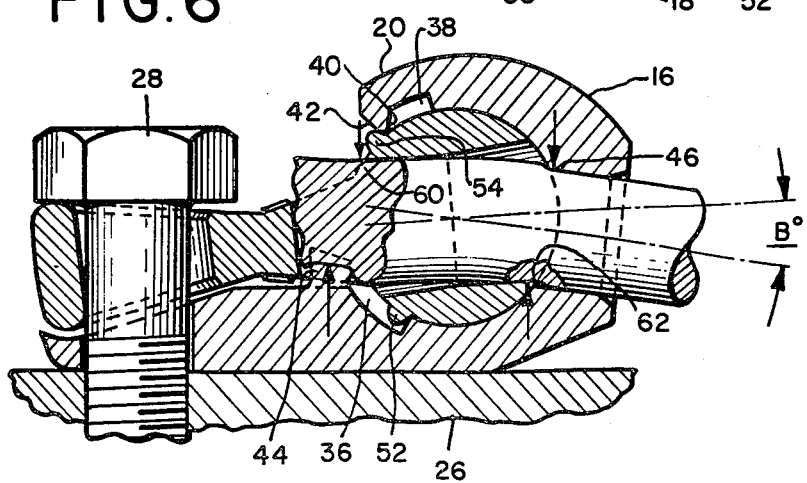

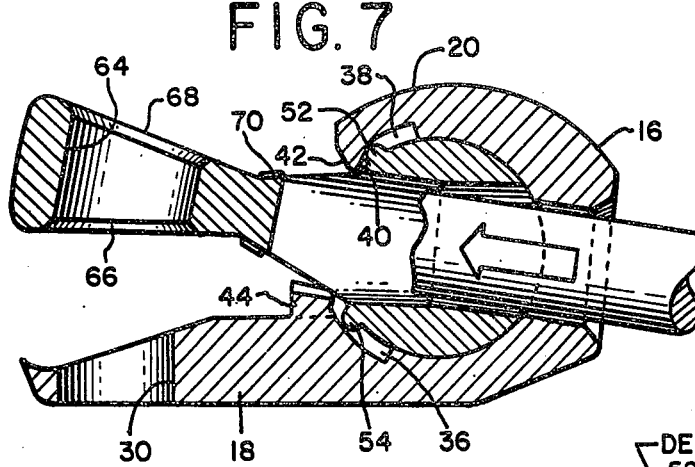
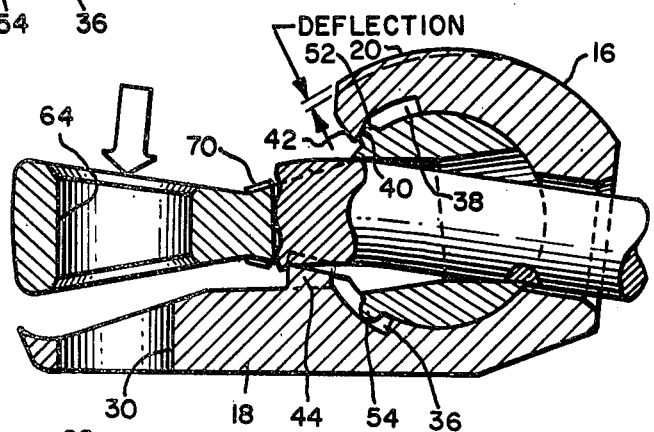
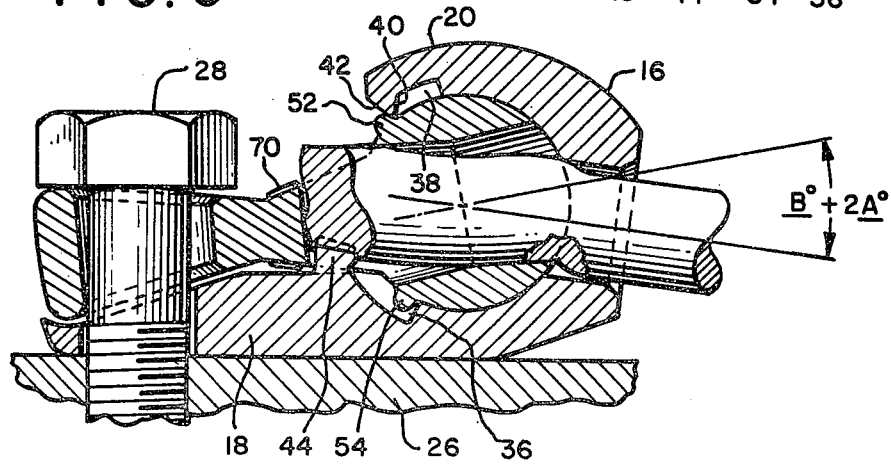

CABLE CLAMPING DEVICE

This application is a continuation of application Ser. No. 136,413, filed Apr. 2, 1980, now U.S. Pat. No. 4,357,068.

BACKGROUND OF THE INVENTION

This invention relates to cable connectors of the rotatable-jaw, clamping type. Such connectors, having relatively rotatable jaws with alignable bores therein adapted to receive the end of a cable, which is then securely clamped between the jaws when they are rotated to a closed position, have become well known in the art. A basic design for such a connector is disclosed in U.S. Pat. No. 3,118,720. As shown therein, such a clamp comprises, in general, a female member having a C-shaped sleeve and a male member having a cylindrical head for relative rotatable movement within the sleeve. The sleeve and head have respective diametrical bores which, in the open position of the connector, are axially aligned to receive a cable (such as an electrical conductor). The male and female members have tails which, when secured together, cause the internal surfaces of the bores to exert clamping forces on the cable. The connector is adapted to be mounted upon same supporting structure, such as a terminal strip in a panel box.

Such connectors are especially useful in the electrical industry, and are being commercialized; one of their particular advantages is their suitability for use with stranded aluminum electrical cables. As a result of their promising commercial potential, they have been the subject of much development and improvement, as is evidenced for example by U.S. Pat. Nos. 3,138,422; 3,351,889; 3,406,372; 3,801,952; 3,831,134; 3,861,771; 3,879,104; 3,883,211; 3,980,381; 3,990,129; 4,001,921; 4,014,078; and 4,126,918. Among the important improvements disclosed in these patents are, for example, X-shaped bores to reduce shearing in U.S. Pat. No. 3,406,372; locking means in U.S. Pat. No. 3,801,952; and size-adjustability in U.S. Pat. No. 4,126,918.

Despite this fairly crowded art reflective of intensive development activity, however, the basic design of such connectors has remained virtually unchanged. The female member is generally C-shaped, with a mounting tail attached to one leg of the C, and with cable-receiving openings or bores through both legs of the C. The male member has a cylindrical head with a diametrical cable-receiving bore, and a mounting tail tangentially attached to the head. The male head is adapted to fit within the C-portion of the female member and the two members are relatively rotatable. In the open position of the connector, the male and female tails are spaced apart, and the male and female bores are in general axial registry to receive a cable. When the cable is inserted, the tails are forced together, and the female member rotates on the male member. This causes clamping forces to be exerted on the cable as follows: At the front end of the connector (that is, the end of the connector at which the cable is inserted; usually through the bore in the free leg of the female C), the lower interior surface of the front female bore presses up against the cable, while the upper interior surface of the front part of the male bore presses down against the cable; similarly, at the rear end of the connector, the upper interior surface of the rear female bore presses down against the cable, while the lower interior surface of the rear part of the male bore presses up against the cable. This results in clamping of the cable by four pressure points: one opposed pair of pressure points at the front of the connector and one opposed pair at the rear. The clamping is completed by securing the tails together, usually by a bolt through registering apertures in the tails; the bolt also serves to mount the connector to the supporting structure.

The locking mechanism disclosed for example in U.S. Pat. No. 3,801,952 permits the connector to be locked in closed or nearly-closed position to hold the cable in place while the clamping is completed—i.e., while the mounting bolt is tightened down. The size-adjustability feature disclosed in U.S. Pat. No. 4,126,918 contemplates some means for altering the cable-clamping or receiving capability of the connector, so that it can accommodate cables of different sizes, by altering the spatial relationship of the axes of the male and female bores. Both of these features are very desirable in commercial devices.

One common feature in these prior art connectors is the relative configuration of the male and female members. The male member is adapted to be mounted directly against the supporting structure, and thus its tail is the lowermost element of the connector. Thus, although rotation between the two members is always properly viewed as being "relative", for practical purposes it is the female member which rotates upon the male member. This dictates the general configuration of the female member: the open portion of the C is directed generally downwardly toward the supporting structure so that there will be clearance between the C legs for rotation. Although at least one prior art patent (U.S. Pat. No. 3,351,889; FIG. 10) does contain an incidential disclosure of a connector in which the male member might be said to rotate within the female member, this disclosure relates to a very specialized type of connector having insulation-piercing jaws for covered wire; moreover, the wire-receiving openings in the female member are again through the legs of the C, and the wire consequently enters the connector from the top. By and large, the prior art connectors disclosed in the listed patents disclose the same male-female configuration in which the male member is asymmetrical, so that its tail can be mounted directly against the supporting structure, and in which the open portion of the C-shaped sleeve in the female member is directed downwardly for clearance in rotation.

SUMMARY OF THE INVENTION

It has now been found that certain radical changes in the configuration of the male and female members of this general type of connector result in a device which, in certain significant aspects, is a great improvement over the prior art. In particular, the present invention results in a device which has greater resistance to cable pull-out, and is much better able to take advantage of the lock and adjustability features discussed above. Adjustability is an especially important feature. Not only is it desirable to have a single connector which will accommodate different sizes of cable, but it has been found that a single connector of the prior art type may not function satisfactorily under all circumstances with the same size cables of different materials, as for example copper and aluminum. The metallurgy of copper and aluminum is such that a given size of connector may be able to close completely and satisfactorily clamp an aluminum cable of a given size, but may not be able to close completely to clamp a copper cable of the same size. The present invention permits the construction of a size-adjustable connector which can accommodate for this difference cheaply and simply, with no additional parts. The present invention also contemplates a unique cam-locking system whereby the connector elements can be locked in partial closure under positive spring pressure during cable installation. These features, and other advantages of the invention, are the result, in whole or in part, of the unique configuration of the male and female members, which may be generally described as follows:

Although the female member has the familiar C-shaped head or sleeve which serves as a rotational socket for the male member, it may be more useful to describe the female member of the present connector as "hook-shaped". The tail portion of the female member may be regarded as the shank of the hook, and the C-shaped head or sleeve is the bend of the hook. The bend of the hook recurves back along the shank so that the point of the hook (the free leg of the C), and consequently the gape of the hook (the open portion of the C) face back generally toward the end of the shank or tail. The bend or bight of the hook (the curved portion of the C) has a cable-receiving opening. The tail or shank portion of the female member is adapted for mounting on a supporting structure.

The male member consists of a cylindrical head with a radial tail. In the preferred embodiment of the invention the male member is symmetrical (that is, the tail portion is symmetrical in cross-section, and its axis of symmetry intersects the cylindrical axis of the head, and at a right angle thereto), but the cylindrical head has a transverse bore or cable-receiving opening which is asymmetrical (that is, the axis of the bore does not coincide with the axis of symmetry of the tail portion). The bore extends beyond the cylindrical boundaries of the head portion into the tail portion, thus forming a slot-like opening in the tail.

The cylindrical head portion of the male member is adapted for rotation within the C-shaped sleeve portion of the female member. When the male and female tails are spaced apart, the cable-receiving opening in the bight of the female sleeve is in general registry with the bore in the male head, so as to permit a cable end to be received therethrough. The cable end extends through the male bore into the slot in the tail. The female tail has a toothlike projection below the male tail slot. Thus when the tails are forced together, and the male and female heads rotated to closed position, the cable is clamped as follows: At the front of the connector the lower interior surface of the front end of the male bore presses upwardly against the cable, while the upper interior surface of the female bore presses downwardly against the cable; at the rear end of the connector, the upper interior surface of the rear end of the male bore presses downwardly against the cable, while the projection on the female tail extends through the slot in the male tail, pressing the cable upwardly. This causes significant upward deformation of the free end of the cable through the slot, increasing resistance to pull-out. This is accomplished, again, with only four pressure points, an opposed pair at the front and an opposed pair at the rear, unlike the device disclosed in U.S. Pat. No. 3,861,771 which requires a separate, fifth pressure point to achieve this result.

As indicated above, U.S. Pat. No. 4,126,918 discloses means for altering the spatial relationship of the axes of the cable-receiving bores in the male and female members, in either the closed or open position of the connector, so as to alter either the cable-receiving or clamping ability of the device. The specific means disclosed for accomplishing this alteration is a rotatable sleeve with an off-axis bore, although any such means would be within the scope of that patent. The present invention provides a connector configuration which is ideally suited to permit the use of the very simplest of such means: i.e., the provision of a symmetrical male member with an off-axis bore, so that the male member may be simply rotated 180 degrees about its axis of symmetry to change the spatial relationship of the bore axes of the male and female members. Thus, in the preferred embodiment of the present invention the axis of the bore in the male head fails to coincide with the axis of symmetry of the male member by some angle A. With the male member inserted in the female member in one of its two possible positions, the axis of the male bore will rotate through some angle B with respect to the axis of the female bore as the connector is operated from fully open (i.e., coincidence of the male and female bore axes) to fully closed. If the male member is inserted in the other position (rotated 180 degrees about its axis of symmetry), the axis of the male bore would then be able to rotate through an angle of B+2A as the connector is operated from fully open to fully closed, thus altering the clamping capability of the device.

The same result could also be achieved in other ways with the present invention. For example, the male member could be made with an asymmetrical tail, thus limiting the degree of relative rotation to the completely closed position depending upon which of the two possible insertion configurations is selected for the male member. Alternatively, off-axis inserts such as disclosed in U.S. Pat. No. 4,126,918 could be utilized.

The present invention also permits the use of a unique locking mechanism. By virtue of the fact that there is no cable-receiving bore in the free leg of the C-shaped head or sleeve of the female member, its resiliency can be better utilized to provide a positive spring action to assist in locking, and also to provide some pressure relief on a portion of the cable during locking. Thus, in the preferred embodiment of the invention, cam surfaces are provided, one on the inner surface of the C-shaped female sleeve near the end of the free leg of the C, and two more spaced appropriately apart on the outer surface of the cylindrical male head. When the connector is in its open position, the cam surfaces do not interengage. When the connector is operated toward its closed position to clamp a cable, one of the male cam surfaces (the "cam", which may take the form of a ridged projection on the cylindrical surface of the male head) begins to engage the female cam surface (the "cam follower", which may take the form of a planar surface which is inclined with respect to the inner cylindrical surface of the female sleeve). This interaction causes some deflection of the free leg of the female sleeve, resulting in a positive spring-like pressure which tends to hold the cable firmly in place as clamping is completed. As the clamp continues to be operated toward its completely closed position, the male cam suddenly disengages from the female cam follower, slipping rearwardly behind a detent which is formed at the end of the free leg of the C (this may be thought of as the "barb" of the hook), and causing the spring pressure on the free leg to be released. Thus the present invention provides a cam locking system which is quite different from that disclosed, for example, in U.S. Pat. Nos. 3,801,952, 3,861,771 and 3,879,104.

These and other advantages and features of the present invention will become apparent from the following detailed description, taken with reference to the drawings, in which:

FIG. 1 is an exploded perspective view of a cable connector which constitutes a preferred embodiment of a present invention;

FIG. 2 is a side elevational view, in cross-section, taken on the line 2—2 of FIG. 1, showing the female member of the cable connector;

FIG. 3 is a side elevational view, in cross-section, taken on the line 3—3 of FIG. 1, showing the male member of the cable connector;

FIG. 2a is a cross-sectional view of the female member taken on the line 2a—2a of FIG. 2;

FIG. 3a is a cross-sectional view of the male member taken on the line 3a—3a of FIG. 3;

FIG. 4 is a side elevational view in cross-section showing the cable connector in its open position for receipt of a given size cable therein;

FIG. 5 is a view similar to that of FIG. 4, showing the connector in partially closed position;

FIG. 6 is a view similar to that shown in FIG. 4 showing the connector in completely closed or clamped position; and FIGS. 7, 8, and 9 are views similar, respectively, to FIGS. 4, 5, and 6, showing the connector adjusted for receipt of a cable of a different size.

DETAILED DESCRIPTION

FIG. 1 shows a cable connector which embodies the present invention. The cable connector comprises a female member 12 and a male member 14. As can best be seen in FIGS. 1, 2, and 2a, the female member 12 is generally hook-shaped in cross-section and comprises a C-shaped head 16 with a mounting tail 18 attached to one leg of the C. The free leg 20 of the C extends rearwardly back along the general direction of the tail 18. A cable receiving opening or bore 22 is formed in the bight of the C. The bore 22 is at the front of the connector when the male element 14 and female element 12 are assembled. The bore 22 has a chamfer 24 at its front end to facilitate insertion of the cable.

The tail portion 18 of the female member 12 has a generally planar bottom surface which is adapted for mounting on a supporting structure 26 by means of a suitable fastener, such as a bolt or screw 28, as shown in FIGS. 6 and 9. As can be seen, the axis of the female bore 22 is slightly angled with respect to the plane of the bottom surface of the tail 18. The tail 18 also includes a mounting aperture 30 near its rearward end. The upper surface 32 of the tail portion 18 is inclined downwardly toward the rear, to mate with the tail portion of the male member 14 as will become apparent hereinafter. The interior surface 34 of the C-shaped head 16 of the female member 12 is generally cylindrical, with a pair of longitudinal slots or grooves 36 and 38. The rearward wall 40 of the groove 38 which is in the free end 20 of the C-shaped head 16 is inclined with respect to the cylindrical surface 34 and forms a cam follower surface. The cam follower 40 terminates in a detent or stop surface 42.

A toothlike projection 44 extends upwardly from the upper surface of the female tail 18 at the rearward edge of the groove 36; the projection 44 provides one clamping surface for the cable, and the upper, interior cylindrical surface 46 at the rear of the bore 22 provides a second clamping surface.

The male member 14 is best shown in FIGS. 1, 3, and 3a. The male member 14 includes tail portion 48 and a generally cylindrical head portion 50. As shown in FIG. 3, the male member 14 is preferably symmetrical in cross-section, except for a pair of ridges or projections 52 and 54 which provide cam surfaces on the cylindrical surface of the male head 50, and except for the orientation of a cable-receiving opening or bore 56 in the male head 50. The cams 52 and 54 are appropriately spaced for travel in either of the grooves 36 and 38 of the female member 12, as will be explained in detail hereinafter.

The bore 56 in the male head 50 preferably has its axis inclined with respect to the axis of symmetry of the male member 14 by some small angle A; as will be explained in detail hereinafter, this feature is the preferable means for providing size adjustability in the cable connector of the present invention. The male bore 56 is preferably somewhat larger in diameter than the female bore 22, and has a generally X-shaped cross-section as disclosed in U.S. Pat. No. 3,406,372. The male bore 56 is extended somewhat into the tail portion 48 of the male member 14 to provide a slot or opening 58 to accommodate the end of the cable and to permit the clamping surface of the projection 44 to engage the cable. Thus, the male member 14 provides a first clamping surface for the cable at the upper interior cylindrical surface 60 at the rear of the bore 56, and a second cable clamping surface at the lower interior cylindrical surface 62 at the front of the bore 56.

The tail portion 48 of the male member 14 also includes a mounting or clamping aperture 64 which is in general alignment with the aperture 30 in the female tail 18 when the male and female components are assembled. The upper and lower surfaces 66 and 68, respectively, of the male tail 48 are inclined to mate with the inclined surface 32 of the female tail 18 when the connector is in its closed position. The male tail 48 also includes a pair of indicia 70 which may be embossed or stamped on the tail surfaces and which are indicative of the size of the cable which the connector is adapted to clamp when the male member 14 is in a given configuration with respect to the female member 12.

Turning now to FIGS. 4, 5, and 6, the operation of the connector will be described. As shown therein, the connector is configured for the clamping of a particular size of cable, as for example a 250MCM cable. In this configuration, the male member 14 has the same orientation as in FIG. 3; accordingly, the uppermost indicium 70 indicates size 250.

As shown in FIG. 4, the connector is in its open or "insertion" position, with the male and female bores 56 and 22 in nearly axial alignment for ease of insertion of the 250 cable. In this position, the cam 54 is in the groove 38 but not in contact with the cam follower 40, and the other cam 52 is free to move in the groove 36.

As the tail portions 18 and 48 are forced together (as the tail portion 48 of the male member 14 moves in the direction of the arrow in FIG. 5), the connector is operated to a partially closed, intermediate clamping position, as shown in FIG. 5. Note that the clamping surface or toothlike projection 44 has begun to contact the cable and to deform it. Note also that the cam 54 is now in engagement with the cam follower surface 40. This cam action causes the free leg 20 of the C-shaped head 16 of the female member 12 to be deflected slightly upwardly; this causes a positive spring pressure to be exerted through the cam surfaces 40 and 54, resulting in a resilient locking pressure of the clamping surface 60 against the cable. The resilient deflection of the free leg 20 may also somewhat relieve the clamping pressure at the clamping surface 46 of the female bore 22. As a result of this cam-locking system, the cable is held securely enough within the connector to prevent pull-out when the connector is in its intermediate or partially closed position, thus enabling the operator to more easily complete the installation and clamping operation, as shown in FIG. 6.

As shown in FIG. 6, the connector is in its fully clamped and locked position (in the drawing some slight separation between the male tail surface 68 and the female tail surface 32 has been left for clarity in showing the interengagement of the parts). The bolt 28 has been inserted through the aperatures 30 and 64 and serves the dual function of holding the tails 18 and 48 together in clamped position, and of mounting the connector to the supporting structure 28. As can be seen, the axis of the male bore 56 has been rotated with respect to the axis of the female bore 22 through some angle B from their co-axial orientation (shown approximately in FIG. 4). The cam 54 has now moved past the terminus of the cam follower surface 40 and has slipped over the detent 42, thus permitting the free end 20 of the C-shaped female head 16 to snap back from its deflected configuration (as shown in FIG. 5). Thus, the cam 54 abuts against the rearward surface of the detent 42, providing a firm mechanical lock which assists in holding the connector in its fully closed or clamped position.

The size 250 cable is now securely clamped between the clamping surfaces 44 and 60 at the rear of the connector and the clamping surfaces 62 and 46 at the front of the connector; the clamping forces are as shown in the direction of the arrows. These clamping forces cause deformation and deflection of the 250 cable as shown. In particular, the orientation and positioning of the clamping surface causes significant upward deflection of the free end of the cable through the slot 58 rearwardly of the clamping surface 60, thus increasing resistance to cable pull-out. The X-shaped cross-section of the male bore 56 reduces undesireable shearing action at the front end of the connector, and the larger aperture of the male bore 56 permits some "bird caging" of the cable, which also increases pull-out resistance, as disclosed in U.S. Pat. No. 3,883,211.

The size adjustability feature of the connector of the present invention can be best understood with reference to FIGS. 7, 8, and 9. As shown therein, the male member 14 is now oriented so that the connector is adapted to receive and clamp a cable of a different size than that of the configuration illustrated in FIGS. 4–6; as for example, a 4/0 cable, which has a slightly smaller diameter than a 250MCM cable. In order to adapt for a 4/0 size cable, the male member has been re-oriented, by rotating 180 degrees about its axis of symmetry. In this orientation, the uppermost indicia 70 now indicates that the connector is adapted to receive a 4/0 cable. As shown in FIG. 7, the male and female bores 56 and 22 are again nearly in axial registry, so that the connector is in the open or insertion position for a 4/0 cable. As a consequence, the male tail 48 is now spaced further from the female tail 18 than was the case in FIG. 4. Again, the cam 52 is not in contact with the cam follower 40, and the other cam 54 is free to move in the groove 36.

As the tails 18 and 48 are moved together in the direction of the arrow in FIG. 8, the cam 52 contacts the cam follower surface 40 again providing the cam locking action as previously described. When the connector is in its fully closed or clamped position as illustrated in FIG. 9, the cam 52 again has moved past the detent 42, permitting the free end 20 of the C-shaped head 16 to snap down into a positive locked position. The location and spacing of the cams 52 and 54 on the cylindrical surface of the male head 50 depends, of course, on the geometry of the grooves 36 and 38, the cam follower 40 and the detent 42, as well as the Angle A.

As shown in FIG. 9, with the male member 14 in this orientation, the axis of the male bore 56 has, in the fully closed or clamped position of the connector, rotated through a greater angle relative to the axis of the female bore 22 than was the case in the orientation illustrated in FIG. 6. This angle is approximately B+2A. Thus, it can be seen that the connector of the present invention is able adequately to clamp a cable of a given size when the male member 14 is in one insertion orientation, and adequately to clamp a cable of a smaller diameter when the male member is rotated 180 degrees about its axis of symmetry so as to assume its second insertion orientation.

Another useful aspect of this adjustability feature is that the connector of the present invention is able to provide varying clamping forces on cables of identical or nearly identical diameter but made of different materials. For example, if one wished to clamp a size 250 aluminum cable, one could use the configuration illustrated in FIGS. 7–9. Similarly, if one wished to clamp a size 250 copper cable, one could use the configuration illustrated in FIGS. 4–6. With the aluminum cable, the relative degree of rotation between the male and female members would be the angle B+2A; the more deformable aluminum could tolerate this degree of clamping action. On the other hand, with the copper cable, the relative degree of rotation would be only the angle B, thus accommodating the connector to the relatively lesser deformability of copper. This provides a solution to a difficult problem in the art: namely, the problem of providing a single rotating-jaw connector which will adequately and safely clamp both aluminum and copper cables of a given diameter. (It should be understood, of course, that it may not be possible to design a connector which will, in all size cases, serve to accommodate both cables of one material but different diameters and also cables of the same diameter, but different materials).

It should also be understood that there are other ways of achieving the differing degrees of relative rotation so as to enable the connector of the present invention to accommodate different sized cables of the same material, or identically-sized cables of different materials. For example, the inclined surfaces of the male tail 48 could be made asymmetrical, thus limiting the degree of closure of the connector in one orientation of the male member 14 versus its other, rotated-180 degrees, orientation. This could be accomplished with or without changing the orientation of the axis of the female bore 22 as shown in the preferred embodiment.

As indicated previously with respect to FIG. 6, and as is also true of FIG. 9, a slight separation between the male and female tails has been left for clarity in showing the interengagement of the parts. In actuality, when the device is in its fully clamped configuration, the upper surface (66 in FIGS. 4–6 and 68 in FIGS. 7–9) would be essentially parallel with the lower surface of the female tail 18, and thus with the plane of the mounting structure 26. Likewise, the under side of the head of the bolt 28 would be parallel with and firmly contacting the surface 66 or 68. Also, the lower surface of the male tail (68 in FIG. 6 and 66 in FIG. 9) would be essentially parallel to and in contact with the upper surface 32 of the female tail 18.

It should be understood that various changes and modifications to the preferred embodiment disclosed herein will be apparent to those skilled in the art. Such changes and modifications can be made without departing from the spirit and scope of the present invention and without diminishing its attendant advantages. It is, therefore, intended that such changes and modifications be covered by the appended claims.

We claim:

1. A device for clamping a cable, said device comprising:
 a generally hook shaped female member including a shank adapted for mounting on a supporting structure and a cable receiving opening through the curve of the hook, said cable receiving opening defining a first clamping surface; and
 a male member including a tail and a generally cylindrical head adapted for rotation within the bend of the hook;
 said male member defining a generally diametrical cable-receiving bore through said head, which bore is aligned with the tail and extends through said head partially into said tail to form an opening in said tail for receiving the free end of the cable;
 said male member defining a second clamping surface adjacent the opening in the tail and a third clamping surface spaced from the opening in the tail;
 said shank defining a protruding fourth clamping surface underlying said opening and adapted to fit into the opening to contact said cable therethrough and to deflect said free end of said cable away from the shank, upwardly out of the tail through said opening, said second clamping surface axially spaced from the fourth clamping surface along the length of the cable such that no portion of the second clamping surface overlies the fourth clamping surface when the male member is rotated to a clamping position;
 said shank defining a region adjacent to the fourth clamping surface and underlying the portion of the second clamping surface closest to the female member when the male member is rotated to the clamping position, said region shaped to prevent confinement and shearing of the free end of the cable between the second clamping surface and the region and to ensure that the free end of the cable is clamped only between the first and third clamping surfaces and between the second and fourth clamping surfaces.

2. The invention of claim 1 wherein the tail extends radially outwardly from the head.

3. The invention of claim 1 wherein the head of the male member defines at least one projection on its exterior surface adjacent the opening; wherein the region of the shank adjacent the fourth clamping surface defines a recess positioned to receive the projection such that the projection moves in the recess as the male member rotates in the female member; and wherein the fourth clamping surface terminates the recess and cooperates with the projection to limit movement of the tail away from the shank.

4. The invention of claim 1 wherein the tail and the shank define respective aligned fastener openings extending therethrough; wherein the tail and shank define respective planar mating surfaces adjacent the respective fastener openings; wherein the shank defines a mounting surface adapted for mounting on a support structure; wherein the angle between the shank mating surface and the shank mounting surface is greater than 10 degrees; and wherein the two mating surfaces are in contact when the male member is rotated in the female member to clamp the cable.

5. The invention of claim 4 wherein the angle between the shank mating surface and the shank mounting surface is about 17 degrees.

6. A device for clamping a cable, said device comprising:
 a generally hook shaped female member including a shank adapted for mounting on a supporting structure and a cable receiving opening through the curve of the hook, said cable receiving opening defining a first clamping surface;
 a male member including a generally cylindrical head adapted for rotation within the bend of the hook and a tail which extends radially outwardly from the head;
 said male member defining a generally diametrical cable-receiving bore which is aligned with and centered on the tail and extends partially into the tail to define a stop surface in the tail transverse to the cable-receiving bore, said bore extending through the tail adjacent the stop surface to form an opening in the tail extending completely therethrough for receiving the free end of the cable;
 said male member defining a second clamping surface adjacent the opening in the tail and a third clamping surface spaced from the opening in the tail;
 said shank defining a protruding fourth clamping surface underlying said opening and adapted to fit into the opening to contact said cable therethrough and to deflect said free end of said cable away from the shank, upwardly out of the tail through said opening, said second clamping surface axially spaced from the fourth clamping surface along the length of the cable such that no part of the second clamping surface overlies the fourth clamping surface when the male member is rotated to a clamping position;
 said shank defining a recess adjacent to the fourth clamping surface and underlying the portion of the second clamping surface closest to the female member when the male member is rotated to the clamping position, said region shaped to prevent confinement and shearing of the free end of the cable between the second clamping surface and the shank and to ensure that the free end of the cable is clamped only between the first and third clamping surfaces and between the second and fourth clamping surfaces.

7. The invention of claim 6 wherein the head of the male member defines at least one projection on its exterior surface adjacent the opening; wherein the recess adjacent the fourth clamping surface is positioned to receive the projection such that the projection moves in the recess as the male member rotates in the female member; and wherein the fourth clamping surface terminates the recess and cooperates with the projection to limit movement of the tail away from the shank.

8. The invention of claim 6 wherein the tail and the shank define respective aligned fastener openings extending therethrough; wherein the tail and shank define respective planar mating surfaces adjacent the respective fastener openings; wherein the shank defines a mounting surface adapted for mounting on a support structure; wherein the angle between the shank mating surface and the shank mounting surface is greater than 10 degrees; and wherein the two mating surfaces are in contact when the male member is rotated in the female member to clamp the cable.

9. The invention of claim 6 wherein the angle between the shank mating surface and the shank mounting surface is about 17 degrees.

* * * * *